(12) United States Patent
Fujiwara

(10) Patent No.: US 6,934,229 B2
(45) Date of Patent: Aug. 23, 2005

(54) PHASE CORRECTION CIRCUIT FOR A DISK REPRODUCTION DEVICE

(75) Inventor: Tsuneo Fujiwara, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 516 days.

(21) Appl. No.: 10/045,697

(22) Filed: Jan. 14, 2002

(65) Prior Publication Data

US 2002/0126598 A1 Sep. 12, 2002

(30) Foreign Application Priority Data

Jan. 17, 2001 (JP) ........................................ 2001-009524

(51) Int. Cl.[7] ............................................. G11B 7/005
(52) U.S. Cl. ............................... 369/47.28; 369/47.31; 369/47.35
(58) Field of Search ........................ 369/47.28, 47.31, 369/47.35

(56) References Cited

U.S. PATENT DOCUMENTS

| | | | |
|---|---|---|---|
| 4,901,035 A | | 2/1990 | Cleveland |
| 4,908,811 A | * | 3/1990 | Yokogawa et al. ....... 369/53.36 |
| 5,282,185 A | * | 1/1994 | Mori et al. ............... 369/47.28 |
| 5,615,060 A | | 3/1997 | Seki et al. |
| 6,314,074 B1 | * | 11/2001 | Kuribayashi ........... 369/124.05 |
| 6,400,653 B1 | | 6/2002 | Torazawa et al. |
| 6,438,081 B2 | * | 8/2002 | Jinbo et al. .............. 369/47.28 |

FOREIGN PATENT DOCUMENTS

| | | |
|---|---|---|
| DE | 38 09 223 C2 | 2/1992 |
| EP | 0 618 574 A2 | 10/1994 |
| EP | 0 986 061 A1 | 3/2000 |
| JP | 10-208248 | 8/1998 |
| KR | 2000-0070840 | 11/2000 |

* cited by examiner

*Primary Examiner*—Hoa T. Nguyen
*Assistant Examiner*—Michael V. Battaglia
(74) *Attorney, Agent, or Firm*—David G. Conlin; William J. Daley, Jr.; Edwards & Angell, LLP

(57) ABSTRACT

A phase correction circuit includes a phase control data generation circuit which judges whether or not the present sector is a leading sector in an ECC block, which is the minimum recording unit in a magneto-optical disk, and generates phase control data by referring to a phase difference data of a previous sector when the present sector is not the leading sector, based on a phase difference detected by a phase difference detection circuit; and a phase control circuit for controlling the phase of a channel clock based on the output of the phase control data generation circuit. With this structure, it becomes possible to provide the phase correction circuit for a disk reproduction device which can generate a sampling clock even when there is a flaw, etc. in a fixed pattern area of the magneto-optical disk, by making a correction so as to avoid or reduce influence by the flaw, etc., and to provide the disk reproduction device using the circuit.

15 Claims, 10 Drawing Sheets

PHASE CORRECTION CIRCUIT FOR A DISK REPRODUCTION DEVICE

FIELD OF THE INVENTION

The present invention relates to a phase correction circuit for a disk reproduction device which generates a channel clock whose phase synchronizes with that of record data, from a disk-type recording medium in which clock marks having phase information are preformatted and the record data and a fixed pattern whose phase synchronizes with that of the record data are recorded in each sector, by using a reproduction signal of the clock marks, and generates a sampling clock whose phase synchronizes with that of the record data by correcting a phase difference between a phase of a reproduction signal of the fixed pattern and the phase of the channel clock; and relates to a disk reproduction device using the same.

BACKGROUND OF THE INVENTION

Recently, magneto-optical disks and magneto-optical disk recording/reproduction devices adopting so-called the external clock method, that is, the method in which marks having phase information (hereinafter referred to as clock marks) are preformatted in a magneto-optical disk, a clock in bits (hereinafter referred to as a channel clock) is generated by a phase synchronization loop [PLL (Phase Locked Loop)] circuit using a reproduction signal of the clock marks, and the channel clock is used for recording/reproduction, have been proposed.

However, since a processing path for generating the channel clock and a processing path for a reproduction signal of recorded data are different, a phase difference is caused.

Therefore, conventionally, phase correction to delay the channel clock by a delay amount corresponding to the phase difference between the phase of the channel clock and the phase of reproduction data from a record pit is carried out at the time of reproduction.

The optimum value of the delay amount varies depending on a device used for recording, or the ambient temperature, etc. Therefore, as shown in FIG. 9, first, a fixed pattern area 103 is provided in each sector 102, and a predetermined fixed pattern 106 is recorded in the fixed pattern area 103 at the same time when recording record data. Then, a phase difference between a fixed pattern reproduction signal FP and a channel clock CCLK is detected, and the delay amount is determined by the phase difference. This method has been generally used.

Besides, it has been carried out that a block 101 for completing error correction processing [hereinafter referred to as an ECC (Error Correction Code) block] is provided so as to include a plurality of the sectors 102, in order to improve durability against a burst error and increase a data usage ratio of a recording medium. In this case, since the ECC block 101 is the minimum recording unit, a plurality of the sectors 102 are recorded at a virtually same time, by the identical device.

When recording/reproducing a magneto-optical disk in the foregoing format, in a magneto-optical disk recording/ reproduction device, as shown in FIG. 10, a clock mark reproduction signal 104 reproduced from a magneto-optical disk 111 by a pick up 112 is changed to a clock mark binarization signal 105 by a signal processing circuit 113, and is inputted to a PLL circuit 114. In the PLL circuit 114, the channel clock CCLK synchronizing with the clock mark binarization signal 105 is generated, and the channel clock CCLK is inputted to a phase control circuit 115.

On the other hand, a reproduction signal of record data reproduced from the magneto-optical disk 111 by the pick up 112 is inputted via the signal processing circuit 113 to an AD converter 116, and is sampled based on a sampling clock SCLK outputted from the phase control circuit 115, which will be mentioned later. An output of the AD converter 116 is inputted to a phase difference detection circuit 117, and the phase difference detection circuit 117 detects a phase difference between the sampling clock SCLK and the fixed pattern reproduction signal FP for each bit using the inputted data after AD conversion, calculates a shift average, and outputs the average as phase difference data 107. The phase difference data 107 is inputted to a holding circuit 118.

To the holding circuit 118, a fixed pattern area identification signal FPA is inputted. Therefore, the holding circuit 118 identifies the fixed pattern area 103 by using the fixed pattern area identification signal FPA, holds the phase difference data 107 of the fixed pattern area 103, and outputs the phase difference data 107 to the phase control circuit 115. The phase control circuit 115 delays the channel clock CCLK inputted from the PLL circuit 114 according to the held phase difference data 107, and outputs the sampling clock SCLK whose phase is controlled.

SUMMARY OF THE INVENTION

The present invention is made in consideration of a problem that, in the foregoing conventional phase correction circuit and a disk reproduction device using the same, when there is a flaw, etc. in a fixed pattern area on a magneto-optical disk and a fixed pattern reproduction signal is of poor quality, a phase difference data comes to be a false value, resulting in a false sampling phase since the phase of a sampling clock is controlled based on the false value, and most of the data of a present sector become errors. The object of the present invention is to provide a phase correction circuit for a disk reproduction device which can generate a sampling clock even when there is a flaw, etc. in the fixed pattern area of a disk-type recording medium, by making a correction so as to avoid or reduce influence by the flaw, etc., and to provide a disk reproduction device using the circuit.

To achieve the foregoing object, a phase correction circuit for a disk reproduction device of the present invention is structured so as to include:

a channel clock generation circuit for generating a channel clock whose phase synchronizes with that of record data, from a disk-type recording medium in which clock marks showing phase information are preformatted and the record data and a fixed pattern whose phase synchronizes with that of the record data are recorded in each sector, by using a reproduction signal of the clock marks;

a phase difference detection circuit for detecting a phase difference between a phase of a reproduction signal of the fixed pattern and the phase of the channel clock generated by the channel clock generating circuit;

a phase control data generation circuit for judging whether or not a present sector is a leading sector in a minimum recording unit in the disk-type recording medium, and generating phase control data by referring to a phase difference data of a previous sector when the present sector is not the leading sector, based on the phase difference data detected by the phase difference detection circuit; and a phase control circuit for controlling the phase of the channel clock based on an output of the phase control data generation circuit, and generating a sampling clock whose phase synchronizes with that of the record data.

According to the foregoing invention, in the disk-type recording medium, the clock marks having phase information are preformatted, and the record data and the fixed pattern whose phase synchronizes with the phase of the record data are recorded in each sector. When reproducing the disk-type recording medium, the phase correction circuit for the disk reproduction device generates the channel clock whose phase synchronizes with the phase of the record data, using the reproduction signal of the clock marks in the channel clock generation circuit. On the other hand, reproduction processing on the record data is carried out through a path different from that for generating the channel clock, so a phase difference is caused between the phase of the reproduction signal of the fixed pattern and the phase of the channel clock generated in the channel clock generation circuit. Therefore, the phase correction circuit detects the phase difference by the phase difference detection circuit, and by correcting the phase difference, it generates the sampling clock whose phase synchronizes with the phase of the record data. With this structure, the sampling clock in the record data of the present sector can be provided appropriately, and reproduction can be carried out appropriately.

Meanwhile, when there is a flaw, etc. in a storage area for the fixed pattern on the disk-type recording medium and the reproduction signal of the fixed pattern is of poor quality, the phase difference of the present sector comes to be a false value. As a result, when the sampling clock is generated based on the false value, a false sampling phase is obtained, and most of the record data of the present sector become errors.

On the other hand, in the present invention, when the phase control data generation circuit generates the phase control data based on the phase difference detected by the phase difference detection circuit, it judges whether or not the present sector is the leading sector in the minimum recording unit in the disk-type recording medium, and when the present sector is not the leading sector, the phase control data generation circuit generates the phase control data by referring to the phase difference data of the previous sector. Then, the phase control circuit controls the phase of the channel clock based on the output of the phase control data generation circuit. Incidentally, the minimum recording unit is a so-called ECC (Error Correction Code) unit for completing error correction processing, which is constituted by a plurality of the sectors. Besides, when referring to the phase difference data of the previous sector, the present invention is not necessarily limited to use the phase difference data of the previous sector only, but it also includes to generate the sampling clock by using the phase difference data of the present sector and the phase difference data of the previous sector.

As a result, when the phase difference data of the present sector has an error, and the sampling phase in the record data of the present sector has an error, the phase control data generation circuit generates the phase control data by referring to the phase difference data of the previous sector, so the phase control data can be generated by referring to the normal phase difference data of the previous sector, resulting in avoiding or reducing errors when reproducing the record data of the present sector.

Therefore, it becomes possible to provide the phase correction circuit for a disk reproduction device which can generate the sampling clock even when there is a flaw, etc. in the fixed pattern area of the disk-type recording medium, by making a correction so as to avoid or reduce influence by the flaw, etc.

To achieve the foregoing object, the phase correction circuit for a disk reproduction device of the present invention is structured such that:

when the present sector is the leading sector in the minimum recording unit, the phase control data generation circuit in the phase correction circuit for a disk reproduction device generates the phase control data by using a phase difference amount indicated by a phase difference data outputted by the phase difference detection circuit, and when the present sector is not the leading sector in the minimum recording unit, the phase control data generation circuit generates the phase control data from an average data of the phase difference data of the previous sector and the phase difference data of the present sector.

According to the foregoing invention, when the present sector is not the leading sector in the minimum recording unit, the phase control data generation circuit generates the phase control data from the average data of the phase difference data of the previous sector and the phase difference data of the present sector. Consequently, when there is a flaw, etc. in the fixed pattern area of the disk-type recording medium, and the phase difference data of the present sector has an error, the phase control data is generated from the average data of the phase difference data of the present sector and the phase difference data of the previous sector, and thus the degree of the error in the false phase difference data of the present sector can be relieved by averaging. Incidentally, the previous sector may be an immediately preceding sector, or may be a plurality of the sectors using further preceding sectors.

As a result, it becomes possible to provide the phase correction circuit for a disk reproduction device which can generate the sampling clock even when there is a flaw, etc. in the fixed pattern area of the disk-type recording medium, by making a correction so as to surely reduce influence by the flaw, etc.

To achieve the foregoing object, the phase correction circuit for a disk reproduction device of the present invention is structured such that:

when the present sector is the leading sector in the minimum recording unit, the phase control data generation circuit in the phase correction circuit for a disk reproduction device generates the phase control data by using a phase difference amount indicated by a phase difference data outputted by the phase difference detection circuit, and when the present sector is not the leading sector in the minimum recording unit, the phase control data generation circuit generates the phase control data based on a value obtained by multiplying the phase difference amount indicated by the phase difference data by a coefficient not more than 1.

According to the foregoing invention, the phase control data generation circuit generates the phase control data based on the value obtained by multiplying the phase difference amount indicated by the phase difference data by the coefficient not more than 1, when the present sector is not the leading sector in the minimum recording unit. Consequently, when there is a flaw, etc. in the fixed pattern area of the disk-type recording medium, and the phase difference data of the present sector has an error, the phase difference data is generated based on the value obtained by multiplying the phase difference amount indicated by the phase difference data of the present sector by the coefficient not more than 1. Thus, the degree of the error in the false phase difference data of the present sector can be relieved by multiplying by the coefficient not more than 1. That is, a large shift of the phase is eliminated as a gain is reduced, restraining influence on phase control.

Therefore, it becomes possible to provide the phase correction circuit for a disk reproduction device which can generate the sampling clock even when there is a flaw, etc. in the fixed pattern area of the disk-type recording medium, by making a correction so as to surely reduce influence by the flaw, etc.

To achieve the foregoing object, the phase correction circuit for a disk reproduction device of the present invention is structured such that:

when the present sector is the leading sector in the minimum recording unit, the phase control data generation circuit in the phase correction circuit for a disk reproduction device generates the phase control data by using a phase difference amount indicated by a phase difference data outputted by the phase difference detection circuit, and when the present sector is not the leading sector in the minimum recording unit, the phase control data generation circuit compares the phase difference data of the previous sector with the phase difference data of the present sector, and when a difference between the phase difference data of the previous sector and the phase difference data of the present sector is greater than a predetermined value, the phase control data generation circuit generates the phase control data based on the phase difference data of the previous sector.

According to the foregoing invention, in the sector except the leading sector in the minimum recording unit, the phase control data generation circuit compares the phase difference data of the previous sector with the phase difference data of the present sector, and when there is a difference greater than the predetermined value, the phase control data generation circuit generates the phase control data based on the phase difference data of the previous sector. Consequently, when there is a flaw, etc. in the fixed pattern area of the disk-type recording medium, and the phase difference data of the present sector has an error, the phase control data generation circuit compares the normal phase difference data of the previous sector with the phase difference data of the present sector, and when there is a difference greater than the predetermined value, the phase difference data is generated based on the normal phase difference data of the previous sector. That is, the phase difference data is generated based on the phase difference data of the previous sector only when there is an error greater than the predetermined value specified beforehand, and when the amount of the error is small, it is regarded as permissible, and the phase difference data of the present sector is used unchanged.

As a result, by correcting only an error exceeding the permissible value, time for error processing can be reduced and regular processing can be performed as much as possible.

To achieve the foregoing object, the disk reproduction device of the present invention uses the phase correction circuit for a disk reproduction device described above.

With this structure, it becomes possible to provide the disk reproduction device using the phase correction circuit which can generate the sampling clock even when there is a flaw, etc. in the fixed pattern area of the disk-type recording medium, by making a correction so as to avoid or reduce influence by the flaw, etc.

For a fuller understanding of the nature and advantages of the invention, reference should be made to the ensuing detailed description taken in conjunction with the accompanying drawings.

DESCRIPTION OF THE PREFERRED EMBODIMENTS

[First Embodiment]

Referring to FIGS. 1 through 6, the following description will describe one embodiment of the present invention. Incidentally, in the present embodiment, explanation will be given on the case where a phase correction circuit is applied to a magneto-optical disk recording/reproduction device as a disk reproduction device. That is, a disk-type recording medium in the present embodiment is a magneto-optical disk. However, the present invention is not limited to a magneto-optical disk, but may also be applied to a simple optical disk. Besides, the disk reproduction device of the present invention is not limited to a reproduction device only, but it is satisfactory as long as the disk reproduction device has at least a reproduction device, so the disk reproduction device may additionally have a recording device.

First, referring to FIG. 2, the following description will explain a format of a magneto-optical disk 21 which will be described later, as a disk-type recording medium used in the present embodiment.

Figure 2:
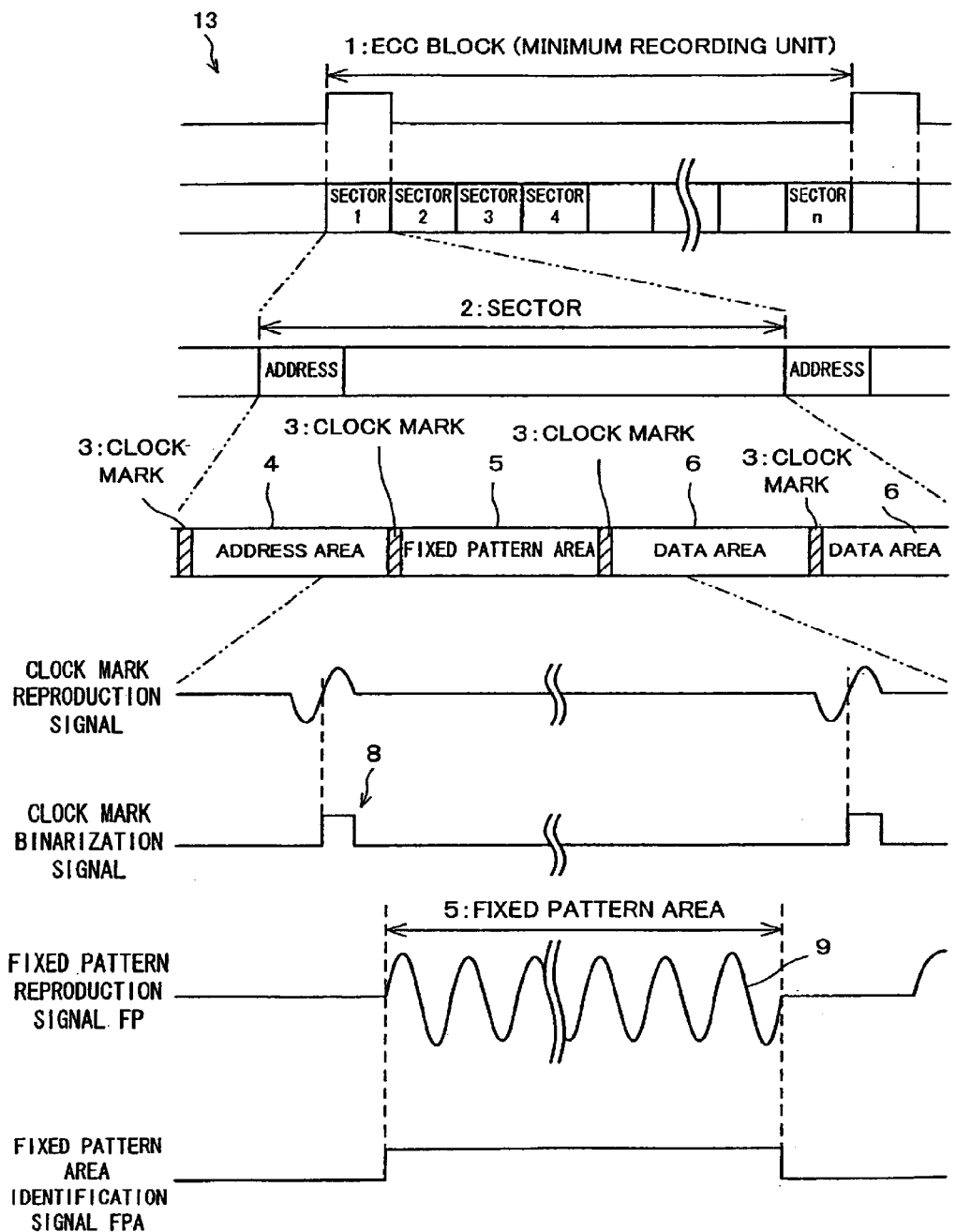
FIG. 2 is an explanatory view showing a format of a magneto-optical disk reproduced by the magneto-optical disk recording/reproduction device.

As shown in FIG. 2, in a storage area of the magneto-optical disk 21, information is stored in every storing units referred to as sectors 2. An address corresponds to each sector 2, and the address can identify the sector 2. In each sector 2, a plurality of clock marks 3 are preformatted respectively at predetermined intervals, and phase information is given by these clock marks 3. An address area 4 in which address information is preformatted is provided in the first interval between the clock marks 3 in each sector 2, a fixed pattern area 5 is provided in the next interval between the clock marks 3, and data areas 6 are provided in the respective intervals between the clock marks 3 provided afterwards.

In the fixed pattern area 5 is recorded a fixed pattern 9 whose phase synchronizes with that of record data, as shown in FIG. 2 as a wave form of a fixed pattern reproduction signal FP. That is, since a magneto-optical disk recording device records the record data together with the fixed pattern 9 at the same time, the phase of the fixed pattern 9 becomes identical to the phase of the record data. Incidentally, when the fixed pattern 9 is reproduced by a magneto-optical disk reproduction device, the fixed pattern reproduction signal FP which has a wave form showing the fixed pattern 9 is obtained by a magneto-optical detection system of the device. Besides, since the fixed pattern 9 and the record data are magneto-optically recorded, a record data reproduction signal is also obtained by the magneto-optical detection system, as a wave form virtually identical to the fixed pattern 9. However, the actual wave form of the record data reproduction signal is determined by the record data recorded in the magneto-optical disk. Further, a fixed pattern area identification signal FPA which will be described later is used as a signal for identifying the fixed pattern area 5.

In the present embodiment, the clock marks 3 are recorded by partially snaking a guide groove for tracking servo (not shown) to the side of a land. Therefore, as shown in FIG. 2, a clock mark reproduction signal 7 is obtained by detecting a push-pull signal in a tangential direction, that is, in a moving direction of an optical spot, by an optical pick up 23 which will be described later. The clock mark reproduction signal 7 is binarized by a signal processing circuit 24 which will be described later to be a clock mark binarization signal 8, which is used for forming a channel clock CCLK in a PLL circuit 25 which will be described later.

Besides, as shown in FIG. 2, n number of the sectors 2 constitute an ECC (Error Correction Code) block 1. The FCC block 1 is a block for completing error correction processing, and regarded as the minimum recording unit. That is, the ECC block 1 is structured such that ECC data is calculated across a plurality of the sectors 2, so as to improve error correction capability. Here, it is ensured that data is recorded in each sector 2 constituting the ECC block 1, by the identical magneto-optical disk recording device at a virtually same time.

Figure 1:
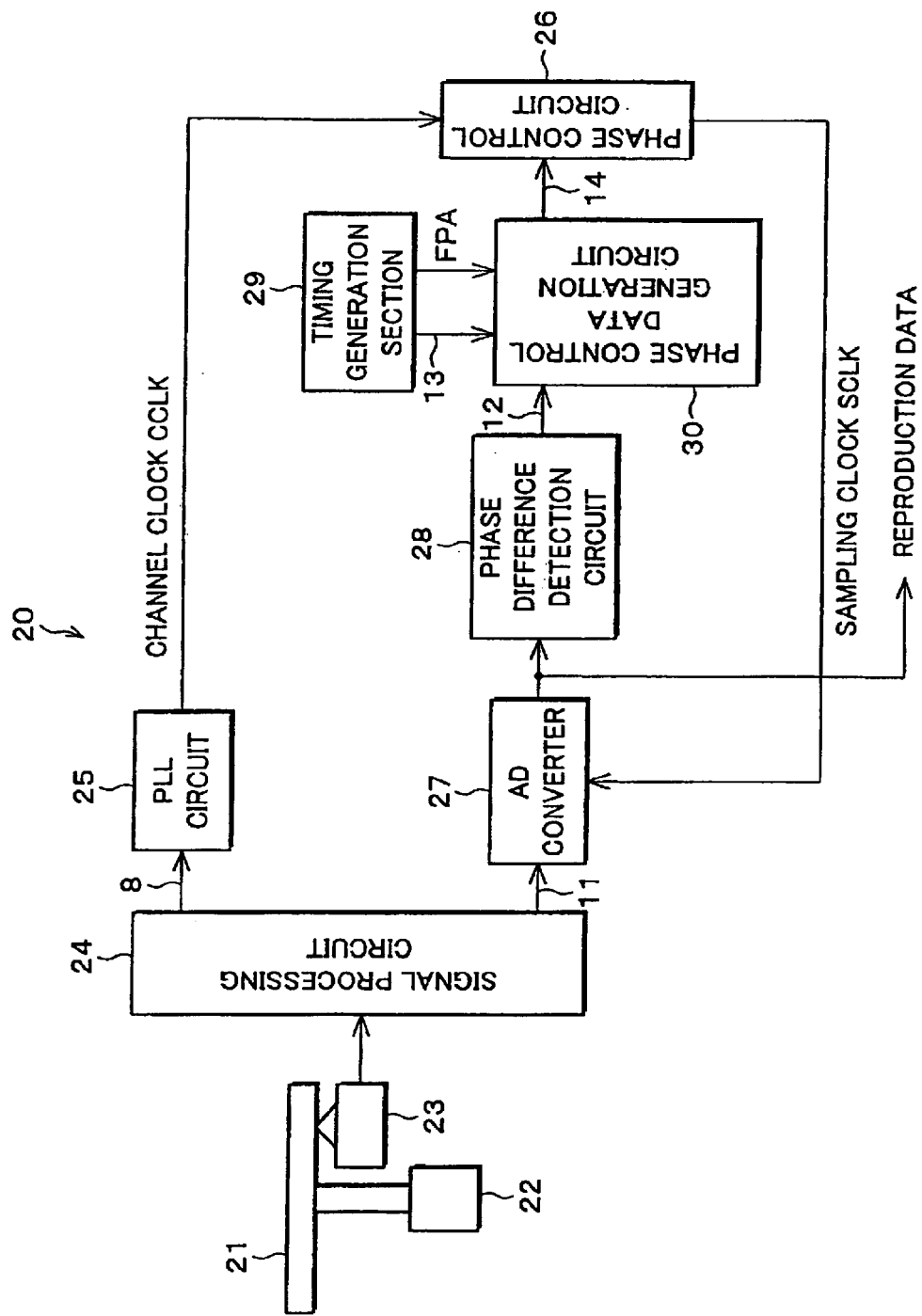
FIG. 1 is a block diagram showing one embodiment of a phase correction circuit for a magneto-optical disk recording/reproduction device in accordance with the present invention.

Next, referring to FIG. 1, the following description will explain a phase correction circuit 20 for the magneto-optical disk recording/reproduction device of the present embodiment.

As shown in FIG. 1, the phase correction circuit 20 includes the signal processing circuit 24, the phase synchronization loop [hereinafter referred to PLL (Phase Locked Loop)] circuit 25 as channel clock generation means, a phase control circuit 26 as phase control means, an AD converter 27, a phase difference detection circuit 28 as phase difference detection means, a timing generation section 29, and a phase control data generation circuit 30 as phase control data generation means.

In the magneto-optical disk recording/reproduction device equipped with the phase correction circuit 20 having the foregoing structure, information (for example, phase information and record data, etc.) recorded in the magneto-optical disk 21 having the foregoing format is reproduced by the optical pick up 23 from the magneto-optical disk 21 rotated by a spindle motor 22, and provided with processing such as amplification, filtering, binarization, etc., by the signal processing circuit 24.

Next, firstly as one processing path, the clock mark binarization signal 8 as a reproduction signal of the clock marks 3, which is outputted from the signal processing circuit 24, is inputted to the PLL circuit 25.

Since the PLL circuit 25 is a PLL circuit of a general structure, detailed explanation will be omitted, but it detects a phase difference between a phase of the inputted clock mark binarization signal 8 and a phase of a signal dividing a clock oscillated by a VCO (Voltage Controlled Oscillator), and smoothes the phase difference by a loop filter and feeds it back to the input of the VCO. Thus, the PLL circuit 25 generates a clock synchronizing with the clock mark binarization signal 8. Here, if a dividing ratio is appropriately selected, the clock outputted by the VCO becomes the channel clock CCLK whose frequency completely coincides with a bit cycle of the record data.

On the other hand, as another processing path, the record data is reproduced from the magneto-optical disk 21 by the optical pick up 23, and provided with processing such as amplification, filtering, etc., by the signal processing circuit 24. Thus, a reproduction signal 11 of magneto-optical record data (hereinafter simply referred to as a record data reproduction signal) is obtained.

However, due to individual differences of magneto-optical disk recording/reproduction devices or difference in ambient temperatures, etc., a mark position of the record data is minutely deviated, and a relative position between the mark position and the clock mark 3 is deviated. Consequently, there is a possibility that a phase difference between a phase of the channel clock CCLK and a phase of the record data reproduction signal 11 might change every time recording/reproduction is carried out.

To detect and adjust the phase difference, in the magneto-optical disk 21 shown in the present embodiment, as mentioned above, the fixed pattern 9 is recorded in the fixed pattern area 5 simultaneously with the record data.

The record data reproduction signal 11 is inputted to the AD converter 27, and the output of the AD converter 27 is inputted to the phase difference detection circuit 28. The phase difference detection circuit 28 detects a phase difference between a phase of a sampling clock SCLK inputted to the AD converter 27 and the phase of the record data reproduction signal 11, using output data of the AD converter 27, by a method which will be mentioned later, and outputs phase difference data 12 as a detection result.

On the other hand, the timing generation section 29 identifies the fixed pattern area 5 based on position information, etc. given from an upper device (not shown) and outputs the fixed pattern area identification signal FPA. As shown in FIG. 2, the fixed pattern area identification signal FPA becomes high when the fixed pattern area 5 is reproduced, and becomes low when other areas are reproduced.

Besides, the timing generation section 29 identifies a boundary of the ECC block 1 based on position information, etc. given from an upper device (not shown) and outputs an ECC block boundary signal 13. Here, as shown in FIG. 2, the ECC block boundary signal 13 becomes high when a present sector 2 is located just after the boundary of the ECC block 1, that is, the present sector 2 is the leading sector 2 of the ECC block 1, and becomes low when the present sector 2 is not the leading sector 2.

Next, to the phase control data generation circuit 30, the phase difference data 12 which is the output from the phase difference detection circuit 28, the fixed pattern area identification signal FPA from the timing generation section 29, and the ECC block boundary signal 13 are inputted.

Although a specific structure of the phase control data generation circuit 30 will be described later, the phase control data generation circuit 30 holds the phase difference data 12, which is the output of the phase difference detection circuit 28, when the fixed pattern area identification signal FPA falls. At this time, when the ECC block boundary signal 13 is high, that is, the present sector 2 is the leading sector 2 of the ECC block 1, the phase control data generation circuit 30 outputs phase control data 14 based on the phase difference data 12, which is the output of the phase difference detection circuit 28, held in the present sector 2; and when the ECC block boundary signal 13 is low, that is, the present sector 2 is not the leading sector 2 of the ECC block 1, the phase control data generation circuit 30 outputs the phase control data 14 based on the phase difference data 12, which is the output of the phase difference detection circuit 28, held in the present sector 2, and the phase difference data 12, which is the output of the phase difference detection circuit 28, held in a past sector 2. In this manner, the phase control data 14 outputted from the phase control data generation circuit 30 is inputted to the phase control circuit 26.

Although a specific structure of the phase control circuit 26 will be described later, the phase control circuit 26 controls the phase of the sampling clock SCLK by delaying the inputted channel clock CCLK by an amount corresponding to the phase control data 14 outputted by the phase control data generation circuit 30, and controls a sampling phase used by the AD converter 27 so as to be an optimum value.

By being structured as above, even when signal quality is deteriorated due to a flaw, etc. in the fixed pattern area 5, and there are many errors in the phase difference data 12 of the present sector 2, it is judged whether the present sector 2 is the leading sector 2 of the ECC block 1 or not, and if it is not the leading sector 2, the phase control data 14 is generated based on the phase difference data 12 of the present sector 2 and the phase difference data 12 of the past sector 2, and the phase of the sampling clock SCLK is controlled. Consequently, this structure can reduce ill effect on phase control.

Figure 3:
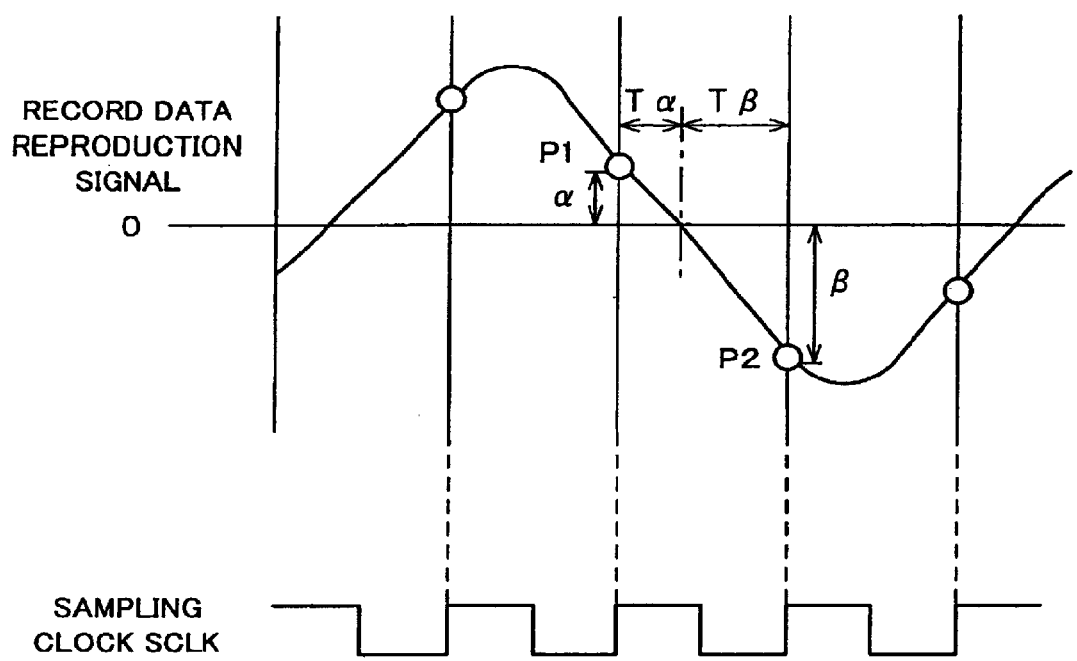
FIG. 3 shows a phase difference detection method in a phase difference detection circuit of the phase correction circuit, and is a wave form chart showing a record data reproduction signal, and a sampling clock corresponding to the record data reproduction signal.
Figure 4:
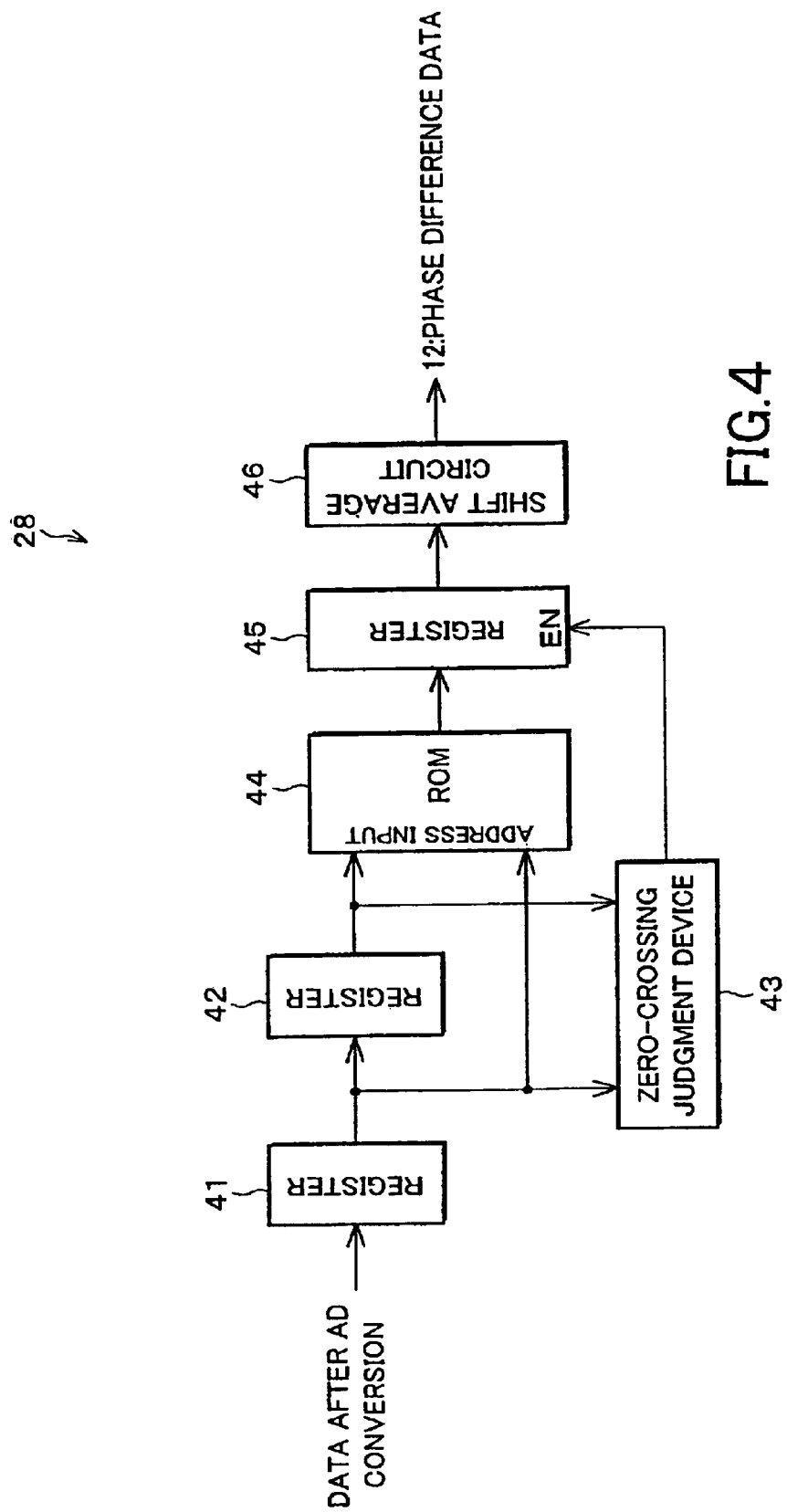
FIG. 4 is a block diagram showing a structure of the phase difference detection circuit.

Here, referring to FIGS. 3 and 4, the following description will describe a specific method for detecting a phase difference in the phase difference detection circuit 28.

First, as mentioned above, the record data reproduction signal 11 sampled by the AD converter 27 is inputted to the phase difference detection circuit 28. The signal is a discrete value, and the zero-crossing vicinity of the fixed pattern reproduction signal FP as a reproduction signal of the fixed pattern 9, that is, the vicinity where the fixed pattern reproduction signal FP crosses the coordinate axis 0, is represented by a discrete point indicated as ○ in the wave form of the record data reproduction signal 11 shown in FIG. 3. Here, when discrete data before and after the zero-crossing are linearly interpolated, it is found that:

$$|\alpha|:|\beta|=|T\alpha|:|T\beta|,$$

where $\alpha$ is an amplitude at a point P1 before the zero-crossing, $\beta$ is an amplitude at a point P2 after the zero-crossing, $T\alpha$ is a time taken from when the fixed pattern reproduction signal FP passes the point P1 to when it zero-crosses, and $T\beta$ is a time taken from when the fixed pattern reproduction signal FP zero-crosses to when it passes the point P2.

Thus, it can be judged how much the phase of the rising of the sampling clock SCLK shown in FIG. 3 is deviated from an ideal sampling phase, that is, the phase where $T\alpha=T\beta$. As a result, the phase difference $\delta$ between the phase of the record data reproduction signal 11 and the phase of the sampling clock SCLK can be calculated by the following equation:

$$\delta=(360°\times|\alpha|/(|\alpha|+|\beta|))-180°,$$

and the phase difference $\delta$ is calculated by the phase difference detection circuit 28 and outputted as the phase difference data 12.

Next, referring to FIG. 4, the following description will explain a structure of the phase difference detection circuit 28 calculating the phase difference $\delta$.

As shown in FIG. 4, the phase difference detection circuit 28 is structured so as to include registers 41 and 42, a zero-crossing judgment device 43, a ROM (Read Only Memory) 44, a register 45, and a shift average circuit 46.

In the phase difference detection circuit 28, inputted data after AD conversion is sequentially stored in the registers 41 and 42. The outputs of the registers 41 and 42 are inputted to the zero-crossing judgment device 43, and when the two inputs have different signs, the zero-crossing judgment device 43 makes a judgment as zero-crossing, and the output becomes high.

This zero-crossing judgment result is inputted to an input terminal EN of the register 45. When the input to the input terminal EN is high, the register 45 holds output data of the ROM 44. Since the outputs ($\beta$, $\alpha$) of the registers 41 and 42 are inputted to address input of the ROM 44, and the results of the foregoing calculation is stored in the ROM 44 beforehand, the register 45 holds the phase difference data 12 calculated from amplitude data ($\alpha$, $\beta$) before and after the zero-crossing. Further, the output of the register 45 is inputted to the shift average circuit 46, and the average of the phase difference data 12 at the zero-crossings from the present zero-crossing to a predetermined number of past zero-crossings is calculated.

When making the average number virtually equal to the number of the zero-crossing in the fixed pattern area 5, at the end of the fixed pattern area 5, that is, at the point where the fixed pattern area identification signal FPA falls, the shift average circuit 46 outputs the average of the phase difference $\delta$ detected in the fixed pattern area 5.

In addition, the shift average circuit 46 refers to an FIR (Finite Impulse Response) filter in which all the tap coefficients are identical. However, the present invention is not limited to this, and a low-pass filter may also be used for the structure.

Figure 5:
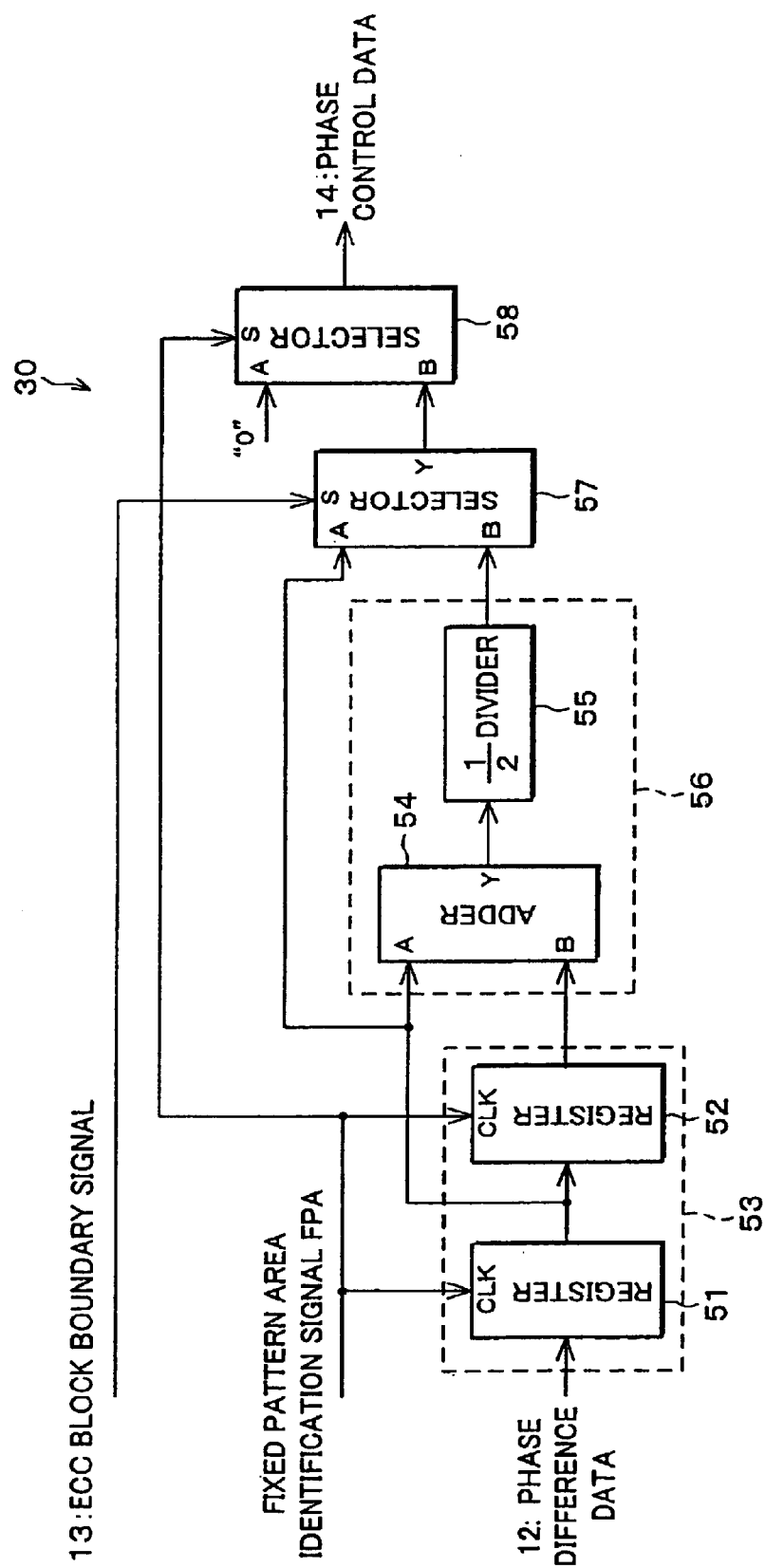
FIG. 5 is a block diagram showing a structure of a phase control data generation circuit in the phase correction circuit.

Next, referring to FIG. 5, the following description will explain a specific structure of the phase control data generation circuit 30 and its operation.

As shown in FIG. 5, the phase control data generation circuit 30 is structured so as to include a shift register 53 constituted by registers 51 and 52, an average circuit 56 constituted by an adder 54 and a ½ divider 55, and selectors 57 and 58. As mentioned above, the phase control data generation circuit 30 holds the phase difference data 12, which is the output of the phase difference detection circuit 28, when the fixed pattern area identification signal FPA falls, and at this time, when the ECC block boundary signal 13 is high, that is, the present sector 2 is the leading sector 2 of the ECC block 1, the phase control data generation circuit 30 outputs the phase control data 14 based on the phase difference data 12, which is the output of the phase difference detection circuit 28, held in the present sector 2;

and when the ECC block boundary signal 13 is low, that is, the present sector 2 is not the leading sector 2 of the ECC block 1, the phase control data generation circuit 30 outputs the phase control data 14 based on the phase difference data 12, which is the output of the phase difference detection circuit 28, held in the present sector 2, and the phase difference data 12, which is the output of the phase difference detection circuit 28, held in the past sector 2.

More specifically, in the phase control data generation circuit 30, first, the phase difference data 12 is inputted to the shift register 53 constituted by the registers 51 and 52, and the outputs of the shift register 53 are inputted to the average circuit 56 constituted by the adder 54 and the ½ divider 55.

Here, since the registers 51 and 52 of the shift register 53 hold the inputs when the fixed pattern area identification signal FPA falls, the shift register 53 holds and shifts the phase difference data 12 of each sector 2 inputted at timing corresponding to the interval of each sector 2. Therefore, the average circuit 56 outputs the average of the phase difference data 12 of the present sector 2 and the phase difference data 12 of an immediately preceding sector 2. Further, the output of the register 51 is inputted to an input terminal A of the selector 57, and the output of the average circuit 56 is inputted to another input terminal B of the selector 57. Besides, the ECC block boundary signal 13 is inputted to an input terminal S of the selector 57.

The selector 57 outputs an input value of the input terminal A when an input signal of the input terminal S is high, and outputs an input value of the input terminal B when the input signal of the input terminal S is low. Since the ECC block boundary signal 13 is high in the leading sector 2 of the ECC block 1, the phase control data generation circuit 30 of the present structure outputs the phase difference data 12 when the present sector 2 is the leading sector 2 of the ECC block 1, and when the present sector 2 is other sectors 2, the phase control data generation circuit 30 outputs an average value of the phase difference data 12 of the present sector 2 and the phase difference data 12 of the immediately preceding sector 2. The output of the selector 57 is outputted via the selector 58, and the output is inputted to the phase control circuit 26 in the next stage. Since the phase control circuit 26 controls phase using the phase control data 14, in the sector 2 except the leading sector 2 of the ECC block 1, even when there is a flaw, etc. in the fixed pattern area 5 and the signal is of poor quality, ill effect on phase control can be reduced.

On the other hand, the selector 58 is provided so as to make a sampling phase in the fixed pattern area 5 of each sector 2 identical. That is, the output of the selector 57 is inputted to an input terminal B of the selector 58, and a predetermined value, for example, "0", is inputted to an input terminal A of the selector 58, and the fixed pattern area identification signal FPA is inputted to an input terminal S of the selector 58. Since the selector 58 outputs an input value of the input terminal A when an input signal of the input terminal S is high, and outputs an input value of the input terminal when the input signal of the input terminal S is low, the predetermined value is always outputted in the fixed pattern area 5.

Therefore, the sampling phase of the fixed pattern area 5 always becomes a phase based on the predetermined value. Incidentally, the foregoing example shows a case where a shift average of the phase difference data 12 of two sectors 2, the present sector 2 and the immediately preceding sector 2, is calculated, but the number of average is not limited to this. Besides, the shift average circuit (the average circuit 56) refers to an FIR filter in which all the tap coefficients are identical, but this part may be structured with a low-pass filter.

Figure 6:
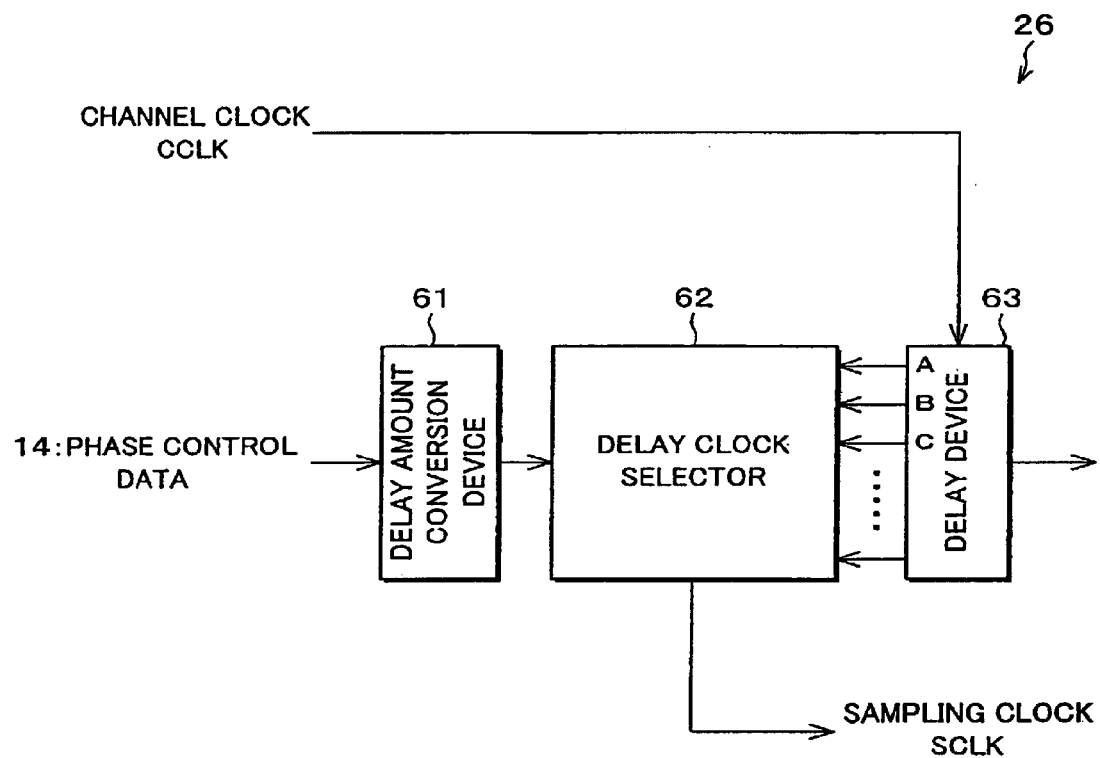
FIG. 6 is a block diagram showing a structure of a phase control circuit in the phase correction circuit.

Next, referring to FIG. 6, the following description will explain a specific structure of the phase control circuit 26.

The phase control circuit 26 is structured such that a delay amount conversion device 61, a delay clock selector 62, and a delay device 63 are connected as shown in FIG. 6. As mentioned above, the phase control circuit 26 controls the phase of the sampling clock SCLK by delaying the inputted channel clock CCLK by an amount corresponding to the phase control data 14 outputted by the phase control data generation circuit 30, and controls the sampling phase used by the AD converter 27 so as to be an optimum value.

That is, in the phase control circuit 26, first, the inputted phase control data 14 is inputted to the delay amount conversion device 61, and the delay amount conversion device 61 converts the phase control data 14 to data for selecting an output tap of the delay device 63 (delay data).

The delay device 63 is structured so as to have delay lines having a predetermined delay amount which are connected in series, and it delays the inputted channel clock CCLK and outputs it from output terminals. Here, if the predetermined delay amount is D, a delay amount of the output terminal A is 0, a delay amount of the output terminal B is D×1, and a delay amount of the output terminal C is D×2.

The delay clock selector 62 selects either one of the outputs of the delay device 63 according to the output of the delay amount conversion device 61, and outputs it as the sampling clock SCLK.

For example, if the cycle of the channel clock CCLK is 8×D, the delay amount conversion device 61 outputs data (delay data) based on which the delay clock selector 62 in the next stage selects a delay amount shown in the following table according to an inputted phase difference.

| PHASE DIFFERENCE (°) | DELAY AMOUNT |
| --- | --- |
| −180 TO −140 | 0 |
| −140 TO −100 | 1 × D |
| −100 TO −60 | 2 × D |
| −60 TO −20 | 3 × D |
| −20 TO +20 | 4 × D |
| +20 TO +60 | 5 × D |
| +60 TO +100 | 6 × D |
| +100 TO +140 | 7 × D |
| +140 TO +180 | 8 × D |

Actual data output can be easily realized by, for example, storing precalculated values in a ROM.

As a result, in the sector 2 except the leading sector 2 of the ECC block 1, the phase control data 14 is generated based on the phase difference data 12 detected in a previous sector 2 and the phase control data 12 of the present sector 2, and the phase of the sampling clock SCLK is controlled based on the phase control data 14. Consequently, in the sector 2 except the leading sector 2 of the ECC block 1, which is the minimum recording unit, even when there is a flaw, etc. in the fixed pattern area 5 and the signal is of poor quality, errors due to false phase control can be reduced.

As has been discussed, in the magneto-optical disk 21 of the present embodiment, the clock marks 3 having phase information are preformatted, and the record data is recorded in the data areas 6 of each sector 2, and the fixed pattern 9 whose phase synchronizes with the phase of the record data is recorded. When reproducing the magneto-optical disk 21, the phase correction circuit 20 for the magneto-optical disk recording/reproduction device generates the channel clock CCLK whose phase synchronizes with the phase of the record data, using the clock mark binarization signal 8 in the PLL circuit 25. On the other hand, reproduction processing on the record data is carried out through a path different from that for generating the channel clock CCLK, so the phase difference δ is caused between the phase of the fixed pattern reproduction signal FP and the phase of the channel clock CCLK generated in the PLL circuit 25. Therefore, the phase correction circuit 20 detects the phase difference δ by the phase difference detection circuit 28, and by correcting the phase difference δ, it generates the sampling clock SCLK whose phase synchronizes with the phase of the record data. With this structure, the sampling clock SCLK in the record data of the present sector 2 can be provided appropriately, and reproduction can be carried out appropriately.

Meanwhile, when there is a flaw, etc. in the fixed pattern area 5 on the magneto-optical disk 21 and the fixed pattern reproduction signal FP is of poor quality, the phase difference δ of the present sector 2 comes to be a false value. As a result, when the sampling clock SCLK is generated based on the false value, a false sampling phase is obtained, and most of the record data of the present sector 2 become errors.

On the other hand, in the present embodiment, when the phase control data generation circuit 30 generates the phase control data 14 based on the phase difference δ detected by the phase difference detection circuit 28, it judges whether or not the present sector 2 is the leading sector 2 in the ECC block 1, which is the minimum recording unit in the magneto-optical disk 21, and when the present sector 2 is not the leading sector 2, the phase control data generation circuit 30 generates the phase control data 14 by referring to the phase difference data 12 of the previous sector 2. Then, the phase control circuit 26 controls the phase of the channel clock CCLK based on the output of the phase control data generation circuit 30. Incidentally, when referring to the phase difference data 12 of the previous sector 2, the present embodiment is not necessarily limited to use the phase difference data 12 of the previous sector 2 only, but it also includes to generate the sampling clock SCLK by using the phase difference data 12 of the present sector 2 and the phase difference data 12 of the previous sector 2.

As a result, even when the phase difference data 12 of the present sector 2 has an error, and the sampling phase in the record data of the present sector 2 becomes an error if the sampling clock SCLK is generated based on the phase difference data 12, since the phase control data generation circuit 30 generates the phase control data 14 by referring to the phase difference data 12 of the previous sector 2, the phase control data 14 can be generated by referring to the normal phase difference data 12 of the previous sector 2, resulting in avoiding or reducing errors when reproducing the record data of the present sector 2.

Therefore, it becomes possible to provide the phase correction circuit 20 for the magneto-optical disk recording/reproduction device which can generate the sampling clock SCLK even when there is a flaw, etc. in the fixed pattern area 5 of the magneto-optical disk 21, by making a correction so as to avoid or reduce influence by the flaw, etc.

In the phase correction circuit 20 for the magneto-optical disk recording/reproduction device of the present embodiment, when the present sector 2 is not the leading sector 2 in the ECC block 1, the phase control data generation circuit 30 generates the phase control data 14 from an average data of the phase difference data 12 of the previous sector 2 and the phase difference data 12 of the present sector 2. Consequently, when there is a flaw, etc. in the fixed pattern area 5 of the magneto-optical disk 21, and the phase difference data 12 of the present sector 2 has an error, the phase control data 14 is generated from the average data of the phase difference data 12 of the present sector 2 and the phase difference data 12 of the previous sector 2, and thus the degree of the error in the false phase difference data 12 of the present sector 2 can be relieved by averaging.

Therefore, it becomes possible to provide the phase correction circuit 20 for the magneto-optical disk recording/reproduction device which can generate the sampling clock SCLK even when there is a flaw, etc. in the fixed pattern area 5 of the magneto-optical disk 21, by making a correction so as to surely reduce influence by the flaw, etc.

In the phase correction circuit 20 for the magneto-optical disk recording/reproduction device of the present embodiment, the phase control data generation circuit 30, which is the phase control data generation means, changes methods for generating the phase control data 14 according to whether or not the present sector 2 is at the boundary of the minimum recording unit of the magneto-optical disk 21, and when the present sector 2 is not at the boundary of the minimum recording unit, the phase control data generation circuit 30 generates the phase control data 14 based on the phase difference of the previous sector 2 and the phase difference of the present sector 2, for phase control.

As a result, a malfunction such that a false phase correction is performed in the sector 2 in which the fixed pattern area 5 has poor signal quality.

The magneto-optical disk recording/reproduction device of the present embodiment is structured so as to use the phase correction circuit 20.

Therefore, it becomes possible to provide the magneto-optical disk recording/reproduction device using the phase correction circuit 20 which can generate the sampling clock SCLK even when there is a flaw, etc. in the fixed pattern area 5 of the magneto-optical disk 21, by making a correction so as to surely reduce influence by the flaw, etc.

[Second Embodiment]

Figure 7:
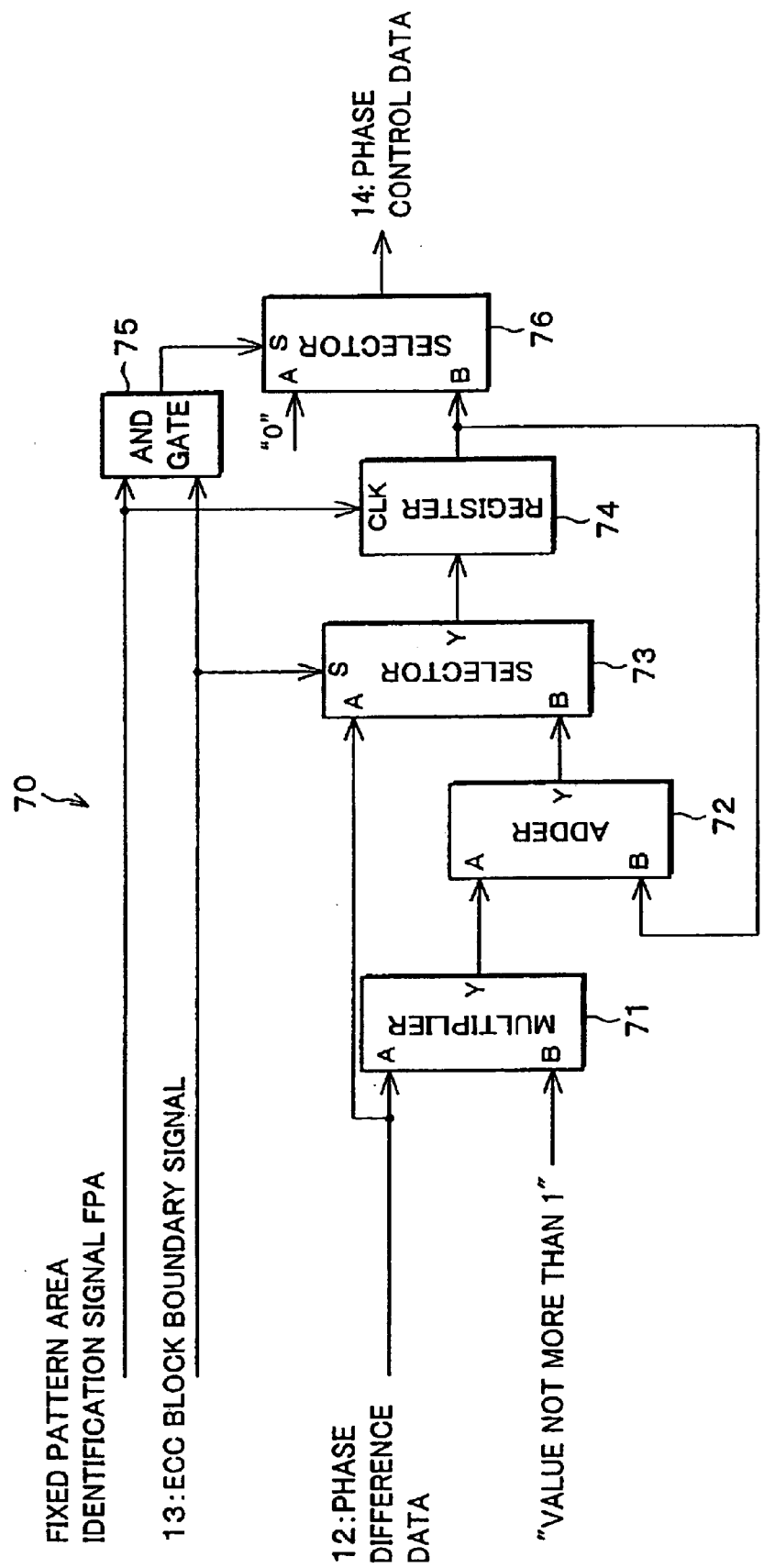
FIG. 7 shows another embodiment of the phase correction circuit for a magneto-optical disk recording/reproduction device in accordance with the present invention, and is a block diagram showing a structure of a phase control data generation circuit.

Referring to FIG. 7, the following description will describe another embodiment of the present invention. Incidentally, the members having the same structure (function) as those in the first embodiment will be designated by the same reference numerals and their description will be omitted. Besides, various characteristics described in the first embodiment can also be combined and applied to the present embodiment.

In the present embodiment, another specific structure of the phase control data generation circuit 30 described in the first embodiment will be explained.

As shown in FIG. 7, a phase control data generation circuit 70, which is phase control data generation means in the present embodiment, is structured so as to include a multiplier 71, an adder 72, an selector 73, a register 74, an AND gate 75, and a selector 76.

In the phase control data generation circuit 70, the inputted phase difference data 12 is inputted to the multiplier 71, and a product of the phase difference data 12 and a predetermined coefficient not more than 1 is calculated. The output of the multiplier 71 is inputted to the adder 72, and added to a value held in the register 74. The output of the adder 72 is inputted to an input terminal B of the selector 73, and the phase difference data 12 is inputted to another input terminal A of the selector 73. The ECC block boundary signal 13 is inputted to an input terminal S of the selector 73.

The selector 73 outputs an input value of the input terminal A when an input signal of the input terminal S is high, and outputs an input value of the input terminal B when the input signal of the input terminal S is low. The fixed pattern area identification signal FPA is inputted to a clock input terminal CLK of the register 74, and the register 74 holds the output of the selector 73 obtained when the fixed pattern area identification signal FPA falls.

According to the phase control data generation circuit 70 of such a structure, since the ECC block boundary signal 13 is high in the leading sector 2 of the ECC block 1, the phase difference data 12 of the present sector 2 is held in the register 74 unchanged and outputted when the present sector 2 is the leading sector 2 of the ECC block 1. When the present sector 2 is other sectors 2, the fixed pattern area 5 is sampled by a sampling phase controlled by the phase control data 14 used in the immediately preceding sector 2. Therefore, the relative phase difference δ between the fixed pattern area 5 of the immediately preceding sector 2 and the fixed pattern area 5 of the present sector 2 is detected by the phase difference detection circuit 28, and the obtained value is multiplied by the coefficient not more than 1, and added to the phase control data 14 held in the register 74.

By controlling the phase using the phase difference data 12 controlled as mentioned above, in the sector 2 except the leading sector 2 of the ECC block 1, even when there is a flaw, etc. in the fixed pattern area 5 and signal quality is deteriorated, a large shift of the phase is eliminated since a gain is reduced by multiplying by the coefficient not more than 1. Thus, ill effect on phase control can be restrained.

The selector 76 is provided so as to detect an absolute value of the phase difference δ in the fixed pattern area 5, by making the sampling phase a predetermined phase "0" in the leading sector 2 of the ECC block 1 and moreover in the fixed pattern area 5. That is, since the ECC block boundary signal 13 and the fixed pattern area identification signal FPA are inputted to the AND gate 75, the output of the AND gate 75 becomes high in the leading sector 2 of the ECC block 1 and moreover in the fixed pattern area 5. On the other hand, the output of the register 74 is inputted to an input terminal B of the selector 76, and a predetermined value, for example, "0", is inputted to an input terminal A of the selector 76. Further, the output of the AND gate 75 is inputted to an input terminal S of the selector 76. Then, the selector 76 outputs an input value of the input terminal A when an input signal of the input terminal S is high, and outputs an input value of the input terminal B when the input signal of the input terminal S is low. Therefore, the predetermined value "0" is always outputted in the leading sector 2 of the ECC block 1 and moreover in the fixed pattern area 5.

As described, in the phase correction circuit 20 for the magneto-optical disk recording/reproduction device of the present embodiment, the phase control data generation circuit 70 generates the phase control data 14 based on a value obtained by multiplying a phase difference amount indicated by the phase difference data 12 by the coefficient not more than 1, when the present sector 2 is not the leading sector 2 of the ECC block 1, which is the minimum recording unit. Consequently, when there is a flaw, etc. in the fixed pattern area 5 of the magneto-optical disk 21, and the phase difference data 12 of the present sector 2 has an error, the phase difference data 12 is generated based on the value obtained by multiplying the phase difference amount indicated by the phase difference data 12 of the present sector 2 by the coefficient not more than 1. Thus, the degree of the error in the false phase difference data 12 of the present sector 2 can be relieved by multiplying by the coefficient not more than 1. That is, a large shift of the phase is eliminated as a gain is reduced, restraining influence on phase control.

Therefore, it becomes possible to provide the phase correction circuit 20 for the magneto-optical disk recording/reproduction device which can generate the sampling clock SCLK even when there is a flaw, etc. in the fixed pattern area 5 of the magneto-optical disk 21, by making a correction so as to surely reduce influence by the flaw, etc., and to provide the magneto-optical disk recording/reproduction device using the circuit.

[Third Embodiment]

Figure 8:
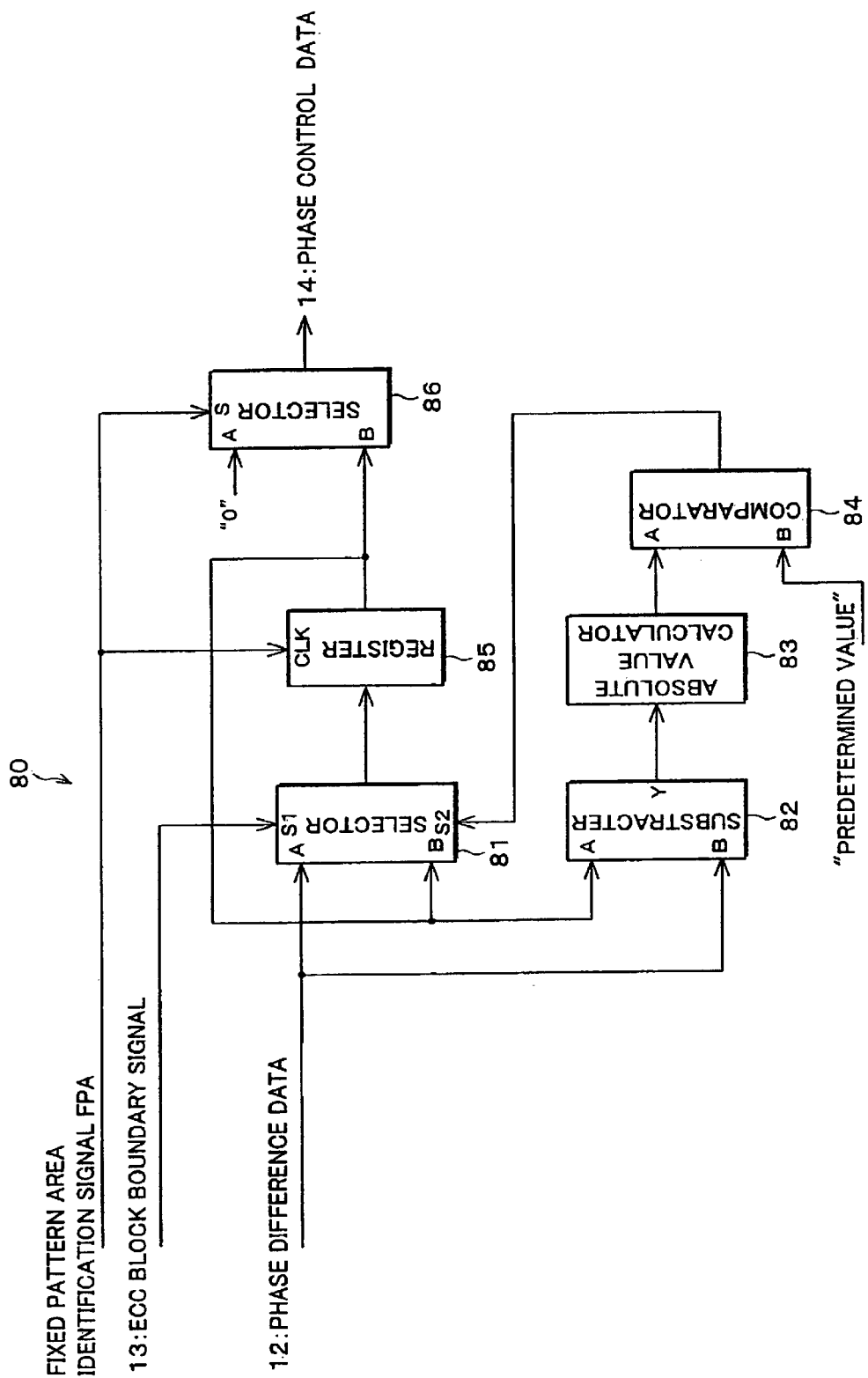
FIG. 8 shows still another embodiment of the phase correction circuit for a magneto-optical disk recording/ reproduction device in accordance with the present invention, and is a block diagram showing a structure of a phase control data generation circuit.
Figure 9:
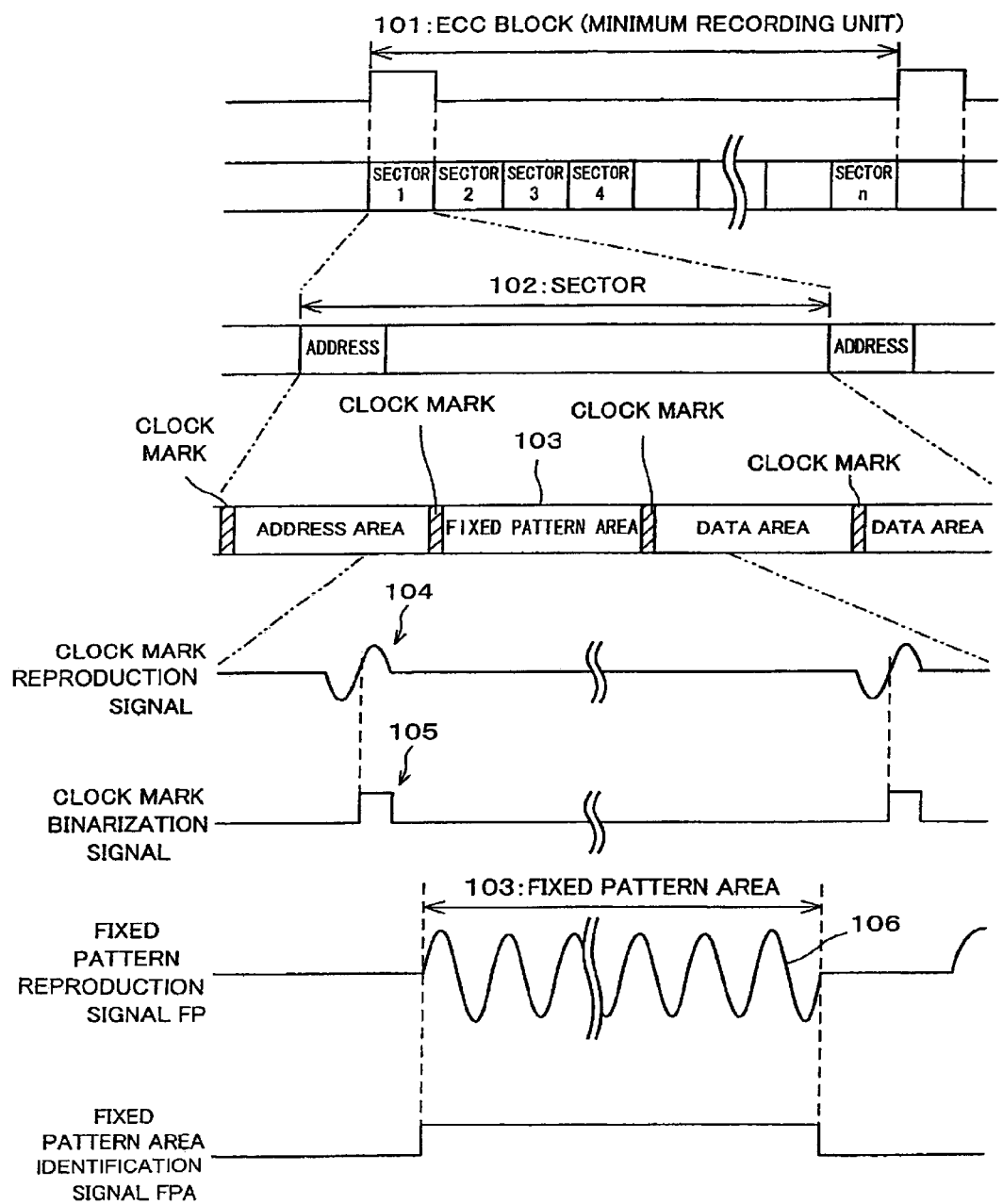
FIG. 9 is an explanatory view showing a format of a magneto-optical disk reproduced by a conventional magneto-optical disk recording/reproduction device.
Figure 10:
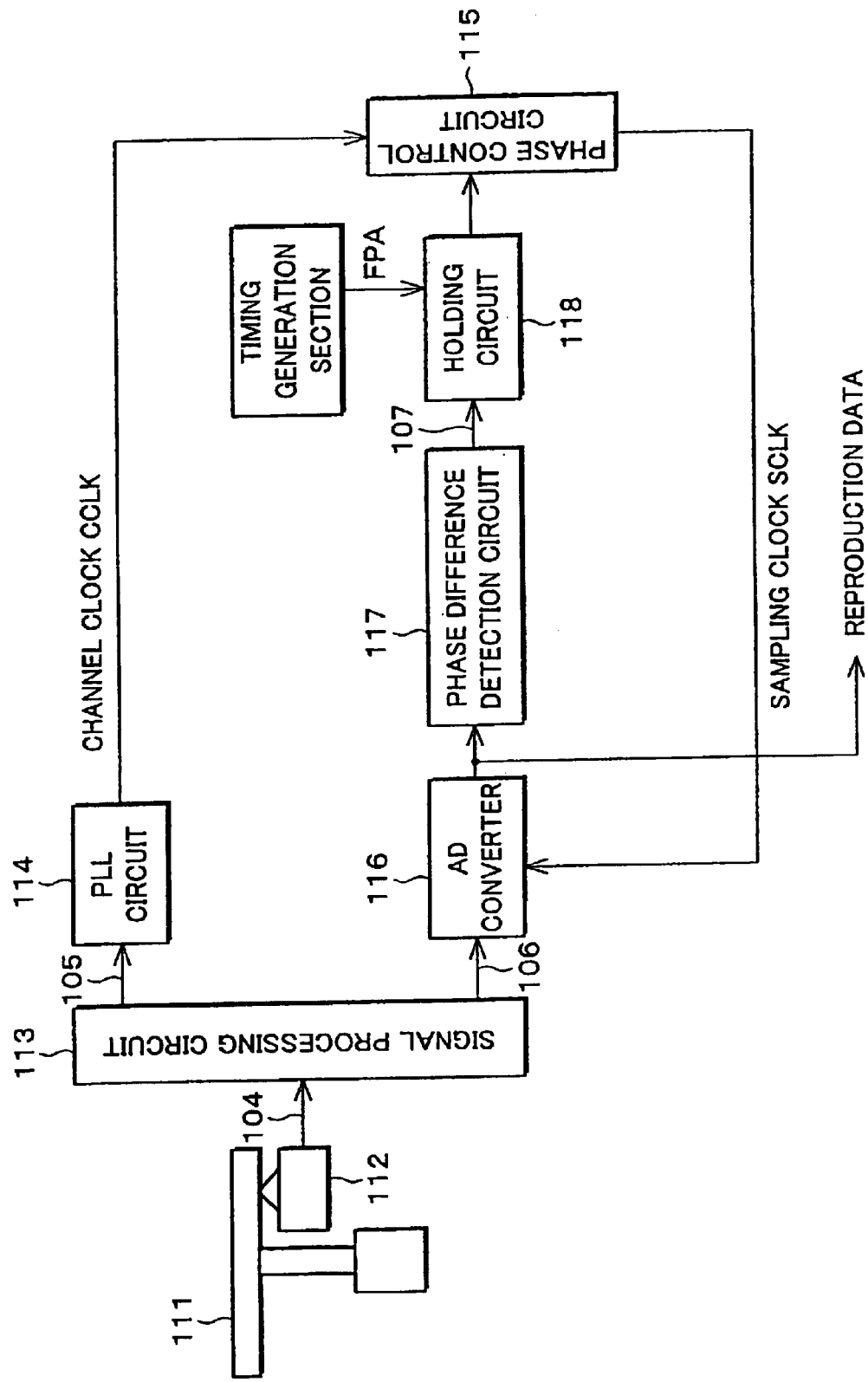
FIG. 10 is a block diagram showing a structure of a phase correction circuit for the conventional magneto-optical disk recording/reproduction device.

Referring to FIG. 8, the following description will describe another embodiment of the present invention. Incidentally, the members having the same structure (function) as those in the first and the second embodiments will be designated by the same reference numerals and their description will be omitted. Besides, various characteristics described in the first and the second embodiments can also be combined and applied to the present embodiment.

In the present embodiment, still another specific structure of the phase control data generation circuit 70 described in the second embodiment will be explained.

As shown in FIG. 8, a phase control data generation circuit 80, which is phase control data generation means in the present embodiment, is structured so as to include a selector 81, a substracter 82, an absolute value calculator 83, a comparator 84, a register 85, and a selector 86.

In the phase control data generation circuit 80, the inputted phase difference data 12 is connected to an input terminal A of the selector 81 and an input terminal B of the substracter 82. Here, the output of the register 85 is connected to an input terminal A of the substracter 82, and the substracter 82 outputs a value obtained by subtracting an input value of the input terminal B from an input value of the input terminal A. The output of the substracter 82 is inputted to the absolute value calculator 83, and an absolute value is outputted. Therefore, the output of the absolute value calculator 83 outputs an absolute value of a difference between the phase difference data 12 of the present sector 2 and the phase difference data 12 held in the register 85. The comparator 84 compares the output of the absolute value calculator 83 with a "predetermined value" of its input terminal B, and the output of the comparator 84 becomes high when the output of the absolute value calculator 83 is greater than the "predetermined value", and it becomes low when the output of the absolute value calculator 83 is smaller than the "predetermined value". The output of the register 85 is inputted to an input terminal B of the selector 81, the ECC block boundary signal 13 is inputted to an input terminal S1 of the selector 81, and the output of the comparator 84 is inputted to an input terminal S2 of the selector 81.

The selector 81 outputs a value of the input terminal A when an input signal of the input terminal S1 is high, regardless of a value of the input terminal S2, outputs the value of the input terminal A when the input signal of the input terminal S1 is low and an input signal of the input terminal S2 is low, and outputs a value of the input terminal B when the input signal of the input terminal S1 is low and the input signal of the input terminal S2 is high.

Therefore, in the leading sector 2 of the ECC block 1, the inputted phase difference data 12 is held in the register 85. On the other hand, in other sector 2, when the difference between the phase difference data 12 held in the register 85 and the phase difference data 12 of the present sector 2 is smaller than a "predetermined value" as a specified value, the register 85 is updated to have the phase difference data 12 of the present sector 2, and when it is greater than the "predetermined value", the phase difference data 12 of the present sector 2 is judged as abnormal, and the register 85 is not updated.

With such an operation, in the sector 2 except the leading sector 2 of the ECC block 1, even when signal quality is deteriorated due to a flaw, etc. in the fixed pattern area 5 and a large phase difference δ is detected, if the absolute value of the phase difference δ is greater than the predetermined value, the phase difference data 12 is abandoned. Consequently, the phase control circuit 26 keeps holding a clock phase of the immediately preceding sector 2, reducing ill effect on phase control.

The selector 86 is provided so as to make a sampling phase in the fixed pattern area 5 of each sector 2 identical. That is, the output of the register 85 is inputted to an input terminal B of the selector 86, and a predetermined value, for example, "0", is inputted to an input terminal A of the selector 86, and the fixed pattern area identification signal FPA is inputted to an input terminal S of the selector 86. Since the selector 86 outputs an input value of the input terminal A when an input signal of the input terminal S is high, and outputs an input value of the input terminal B when the input signal of the input terminal S is low, the predetermined value is always outputted in the fixed pattern area 5. Therefore, the sampling phase of the fixed pattern area 5 always becomes a phase based on the predetermined value, and the phase difference data 12 can be measured by the sampling clock SCLK having the same phase in each sector 2.

As described, in the phase correction circuit 20 for the magneto-optical disk recording/reproduction device of the present embodiment, in the sector 2 except the leading sector 2 of the ECC block 1, which is the minimum recording unit, the phase control data generation circuit 80 compares the phase difference data 12 of the previous sector 2 with the phase difference data 12 of the present sector 2, and when there is a difference greater than the "predetermined value", the phase control data generation circuit 80 generates the phase control data 14 based on the phase difference data 12 of the previous sector 2. Consequently, when there is a flaw, etc. in the fixed pattern area 5 of the magneto-optical disk 21, and the phase difference data 12 of the present sector 2 has an error, the phase control data generation circuit 80 compares the normal phase difference data 12 of the previous sector 2 with the phase difference data 12 of the present sector 2, and when there is a difference greater than the "predetermined value", the phase difference data 12 is generated based on the normal phase difference data 12 of the previous sector 2. That is, the phase difference data 12 is generated based on the phase difference data 12 of the previous sector 2 only when there is an error greater than the "predetermined value", specified beforehand, and when the amount of the error is small, it is regarded as permissible, and the phase difference data 12 of the present sector 2 is used unchanged.

As a result, by correcting only an error exceeding the "predetermined value", which is the permissible value, time for error processing can be reduced and regular processing can be performed as much as possible.

The magneto-optical disk recording/reproduction device of the present embodiment uses the phase control data generation circuit 80 in the phase correction circuit 20.

With this structure, it becomes possible to provide a disk reproduction device using the phase control data generation circuit 80 in the phase correction circuit 20 which can generate the sampling clock SCLK even when there is a flaw, etc. in the fixed pattern area 5 of the magneto-optical disk 21, by making a correction so as to reduce influence by the flaw, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A phase correction circuit for a disk reproduction device, comprising:
    channel clock generation means for generating a channel clock whose phase synchronizes with that of record data, from a disk-type recording medium in which clock marks showing phase information are preformatted and the record data and a fixed pattern whose phase synchronizes with that of the record data are recorded in each sector, by using a reproduction signal of the clock marks;
    phase difference detection means for detecting a phase difference between a phase of a reproduction signal of the fixed pattern and the phase of the channel clock generated by the channel clock generating means;
    phase control data generation means for judging whether or not a present sector is a leading sector in a minimum recording unit in the disk-type recording medium, and generating phase control data by referring to a phase difference data of a previous sector when the present sector is not the leading sector, based on the phase difference data detected by the phase difference detection means; and
    phase control means for generating a sampling clock whose phase synchronizes with that of the record data, by controlling the phase of the channel clock based on an output of the phase control data generation means.

2. The phase correction circuit for a disk reproduction device as set forth in claim 1, wherein:
    when the present sector is the leading sector in the minimum recording unit, the phase control data generation means generates the phase control data by using a phase difference amount indicated by a phase difference data outputted by the phase difference detection means, and when the present sector is not the leading sector in the minimum recording unit, the phase control data generation means generates the phase control data from an average data of the phase difference data of the previous sector and the phase difference data of the present sector.

3. The phase correction circuit for a disk reproduction device as set forth in claim 2, wherein the phase control data generation means includes:
    a shift register for storing respective phase difference data of the sectors from a sector which is a predetermined number of sectors before the present sector to the present sector;
    an average circuit for calculating an average value of the respective phase difference data stored in the shift register; and
    a first selector which selects the phase difference data of the present sector when the present sector is the leading sector, selects an output of the average circuit when the present sector is not the leading sector, and outputs the selected one.

4. The phase correction circuit for a disk reproduction device as set forth in claim 3, comprising a second selector which selects a predetermined value when the fixed pattern is reproduced, selects an output of the first selector at other times, and outputs the selected one.

5. The phase correction circuit for a disk reproduction device as set forth in claim 1, wherein:
    when the present sector is the leading sector in the minimum recording unit, the phase control data generation means generates the phase control data by using a phase difference amount indicated by a phase difference data outputted by the phase difference detection means, and when the present sector is not the leading sector in the minimum recording unit, the phase control data generation means generates the phase control data based on a value obtained by multiplying the phase difference amount indicated by the phase difference data by a coefficient not more than 1.

6. The phase correction circuit for a disk reproduction device as set forth in claim 5, wherein the phase control data generation means includes:

a multiplier for multiplying the phase difference data of the present sector by the coefficient;

a register for holding and outputting an input in a sector which is one sector before the present sector;

an adder for adding an output of the multiplier and an output of the register; and a first selector which selects the phase difference data of the present sector when the present sector is the leading sector, selects an output of the adder when the present sector is not the leading sector, and outputs the selected one to the register.

7. The phase correction circuit for a disk reproduction device as set forth in claim 6, comprising a second selector which selects a predetermined value when the fixed pattern is reproduced from the leading sector, selects the output of the register at other times, and outputs the selected one.

8. The phase correction circuit for a disk reproduction device as set forth in claim 1, wherein:

when the present sector is the leading sector in the minimum recording unit, the phase control data generation means generates the phase control data by using a phase difference amount indicated by a phase difference data outputted by the phase difference detection means, and when the present sector is not the leading sector in the minimum recording unit, the phase control data generation means compares the phase difference data of the previous sector with the phase difference data of the present sector, and when a difference between the phase difference data of the previous sector and the phase difference data of the present sector is greater than a predetermined value, the phase control data generation means generates the phase control data based on the phase difference data of the previous sector.

9. The phase correction circuit for a disk reproduction device as set forth in claim 8, wherein the phase control data generation means includes:

a register for holding and outputting an input in a sector which is one sector before the present sector;

a calculator for calculating an absolute value of a difference between an output of the register and the phase difference data of the present sector;

a comparator for comparing an output of the calculator with a predetermined value; and a first selector which selects the phase difference data of the present sector when the present sector is the leading sector, regardless of an output of the comparator; selects the output of the register when the present sector is not the leading sector and moreover the output of the calculator is judged by the comparator to be more than the predetermined value; selects the phase difference data of the present sector at other times; and outputs the selected one to the register.

10. The phase correction circuit for a disk reproduction device as set forth in claim 9, comprising a second selector which selects a predetermined value when the fixed pattern is reproduced, selects the output of the register at other times, and outputs the selected one.

11. The phase correction circuit for a disk reproduction device as set forth in claim 1, wherein the phase difference detection means includes:

sampling means for sampling the reproduction signal of the fixed pattern in synchronization with the sampling clock;

zero-crossing judgment means for judging a presence or an absence of a zero-crossing of the reproduction signal based on a sampling result of the sampling means; and detection means for detecting a phase difference between the sampling clock and the reproduction signal, based on a first sampling result before the zero-crossing and a second sampling result after the zero-crossing.

12. The phase correction circuit for a disk reproduction device as set forth in claim 11, wherein:

the detection means detects δ which is defined as:

$$\delta = (360° \times |\alpha|/(|\alpha|+|\beta|)) - 180°,$$

where α is the first sampling result, and β is the second sampling result, as the phase difference.

13. The phase correction circuit for a disk reproduction device as set forth in claim 11, wherein:

the phase difference detection means includes a shift average circuit for averaging phase differences at a predetermined number of the zero-crossings in the fixed pattern.

14. The phase correction circuit for a disk reproduction device as set forth in claim 13, wherein:

the number of the zero-crossings is determined at a number virtually identical to a number of zero-crossings of the fixed pattern.

15. A disk reproduction device including the phase correction circuit as set forth in claim 1.

* * * * *